United States Patent [19]

Kassai

[11] Patent Number: 4,671,574
[45] Date of Patent: Jun. 9, 1987

[54] CONSTRUCTION FOR ATTACHING SAFETY GUARD FOR CHILD'S AUXILIARY SEAT FOR AUTOMOBILES

[75] Inventor: Kenzou Kassai, Osaka, Japan
[73] Assignee: Aprica Kassai Kabushikikaisha, Osaka, Japan
[21] Appl. No.: 893,498
[22] Filed: Aug. 5, 1986
[30] Foreign Application Priority Data

Aug. 5, 1985 [JP] Japan .................. 60-172748

[51] Int. Cl.$^4$ .................. A47C 31/00; B60R 21/00
[52] U.S. Cl. .................. 297/487; 297/149; 297/216; 297/488
[58] Field of Search .................. 297/487, 488, 149, 150, 297/151, 216, 153, 250

[56] References Cited

U.S. PATENT DOCUMENTS

| | | | |
|---|---|---|---|
| 2,024,667 | 12/1935 | Stinson | 297/149 |
| 4,105,247 | 8/1978 | Saint | 297/149 |
| 4,568,122 | 2/1986 | Kain | 297/487 |
| 4,582,359 | 4/1986 | Wise et al. | 297/151 |

FOREIGN PATENT DOCUMENTS

| | | |
|---|---|---|
| 45832 | 3/1980 | Japan . |
| 87828 | 6/1980 | Japan . |
| 34527 | 9/1984 | Japan . |

Primary Examiner—James T. McCall
Attorney, Agent, or Firm—W. G. Fasse; D. H. Kane, Jr.

[57] ABSTRACT

A construction for attaching a safety guard for a child's auxiliary seat for automobiles comprises a pair of handrails, and a safety guard adapted to be slid on the handrails in the longitudinal direction. The safety guard is provided at its right- and left-hand sides with depending members and sliders. The sliders are transversely slidable and constantly urged to abut against the inner lateral sides of the handrails. The abutting portions of the handrails and sliders are provided with engagement ridges and recesses which, when engaged with each other, inhibit the longitudinal slide movement of the safety guard. If the engagement between the engagement ridges and recesses, on one side of the auxiliary seat, is canceled, the safety guard is allowed to turn around the axis of the handrail disposed on the other side. If the pair of sliders are manipulated against the forces of the springs for slide movement, the engagement between the engagement ridges and recesses is canceled, whereby the safety guard can be longitudinally slid. When the hands are removed from the sliders after the safety guard has been slid to a predetermined position, the engagement ridges and recess engage each other again, whereby the attaching position of the safety guard is fixed.

10 Claims, 9 Drawing Figures

4,671,574

CONSTRUCTION FOR ATTACHING SAFETY GUARD FOR CHILD'S AUXILIARY SEAT FOR AUTOMOBILES

FIELD OF THE INVENTION

This invention relates to a child's auxiliary seat for automobiles, particularly to a construction for attaching a safety guard for a child's auxiliary seat for automobiles.

DESCRIPTION OF THE PRIOR ART

A child's auxiliary seat for automobiles is used, for example, for increasing the sitting height of a child seated in an automobile or for retaining a child's body in a fixed position during the running of the automobile. Generally, this type of child's auxiliary seat for automobiles is equipped with a safety guard. The safety guard serves to prevent the child from being thrown forward from the auxiliary seat as in the event of a car crash.

Child's safety guard-equipped auxiliary seats for automobiles are disclosed in Japanese Utility Model Laid-Open Nos. 45832/1980 and 87828/1980 and Japanese Utility Model Publication No. 34527/1984. In each of the child's auxiliary seats for automobiles disclosed in these official gazettes, a pair of vertical pins installed in the right- and left-hand sides of the auxiliary seat body are used for the installation of the safety guard. Thus, the safety guard is formed with through-holes for receiving said pins. The pins installed on the body are aligned with the through-holes formed in the safety guard, whereby the safety guard is attached to the auxiliary seat.

When it is desired to set a child on the auxiliary seat or take him down from the auxiliary seat, the engagement between the pins located on the right- and left-hand sides of the auxiliary seat and the through-holes is canceled for removal of the safety guard. Alternatively, the engagement between the pin and the through-hole which are located on one side is canceled and the safety guard is turned around the axis of the pin installed on the other side.

However, in the case where pins are used to attach the safety guard to the auxiliary seat, as described above, the following problem arises: for example, in the event of a car crash, the child's body is moved to hit the safety guard. As a result, the safety guard is subjected to a force which causes it to move forward, so that the pins connecting the safety guard to the auxiliary seat are subjected to enormous impacts. However, the pins do not generally have sufficient strength to withstand such enormous impacts.

Further, another problem arises in the case where the engagement between the safety guard and the auxiliary seat, on one side, is canceled and the safety guard is turned around on the other side, in order to open the space in front of the auxiliary seat. That is, since the turning of the safety guard is effected in a substantially horizontal plane, extra spaces in front and laterally of the auxiliary seat are required in order not to interfere with the turning movement of the safety guard.

Further, the conventional child's auxiliary seat for automobiles has its attaching position fixed; thus, it has been impossible to move the auxiliary seat forwardly or laterally. For this reason, when a physically big child sits on the child's auxiliary seat for automobiles, the spacing between his body and the safety guard is so narrow that he feels cramped. On the other hand, when a physically small child sits on the child's auxiliary seat for automobiles, the spacing between his body and the safety guard is larger than necessary.

SUMMARY OF THE INVENTION

Accordingly, an object of the invention is to provide a construction for attaching a safety guard for a child's auxiliary seat for automobiles, which has sufficient strength to withstand enormous impacts, whose attaching position can be moved forwardly or backwardly and which does not require any extra space around it.

The construction for attaching a safety guard for a child's auxiliary seat for automobiles according to the invention comprises a pair of longitudinally extending handrails on the right- and left-hand sides of the child's auxiliary seat for automobiles, and a safety guard installed across said pair of handrails. The safety guard is slidable longitudinally on the pair of handrails.

Fixedly installed on the right- and left-hand sides of the safety guard are a pair of depending members extending downward while abutting against the outer lateral sides of the pair of handrails. Further, installed on the right- and left-hand sides of the safety guard are a pair of sliders adapted to abut against the inner lateral and bottom sides of the pair of handrails. Each slider is slidable transversely of the auxiliary seat. Further, each slider is constantly urged by a spring to abut against the inner lateral side of the corresponding handrail.

Formed on the abutting portions of each handrail and slider are an engagement ridge or ridges and an engagement recess of recesses, respectively, which, when engaged with each other, prevent the longitudinal slide movement of the corresponding slider. There should be a plurality of at least either such engagement ridges or such engagement recesses, arranged in the longitudinal direction.

Since the safety guard is attached to the auxiliary seat body by means of the engagement between said engagement ridges and recesses, the strength to withstand impacts is much higher than when pins are used for such attachment. Further, if the engagement between the engagement ridges and recesses, on one side of the auxiliary seat, is canceled, the safety guard can be turned around the axis of the handrail disposed on the other side. Since this turning movement is produced in a substantially vertical plane, there is no need to provide any extra space in front of the child's auxiliary seat.

If the slider is manipulated for slide movement against the forces of the springs, the engagement between the engagement ridges and recesses is canceled to thereby allow longitudinal slide movement of the safety guard. When the hands are removed from the sliders after the safety guard has reached a predetermined position, the slides are slid by the forces of the springs until the engagement ridges and recesses engage each other again, whereby the attaching position of the safety guard is fixed.

As described above, according to the invention, since the attaching position of the safety guard is fixed by engaging the engagement ridges and recesses with each other, sufficiently high strength is ensured to withstand enormous impacts on the safety guard. Further, since the attaching position of the safety guard can be adjusted in the longitudinal direction, the attaching position can be moved to the best position according to the size of the body of a child who sits on the child's auxiliary seat for automobiles. Further, when it is desired to turn the safety guard for a child's auxiliary seat for automobiles to open the space in front of the safety guard, since such turning movement is produced, not in a horizontal plane as in the conventional child's auxiliary seat, but around the axis of the longitudinally extending handrail, there is no need to provide any extra space in front of the child's auxiliary seat for automobiles.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
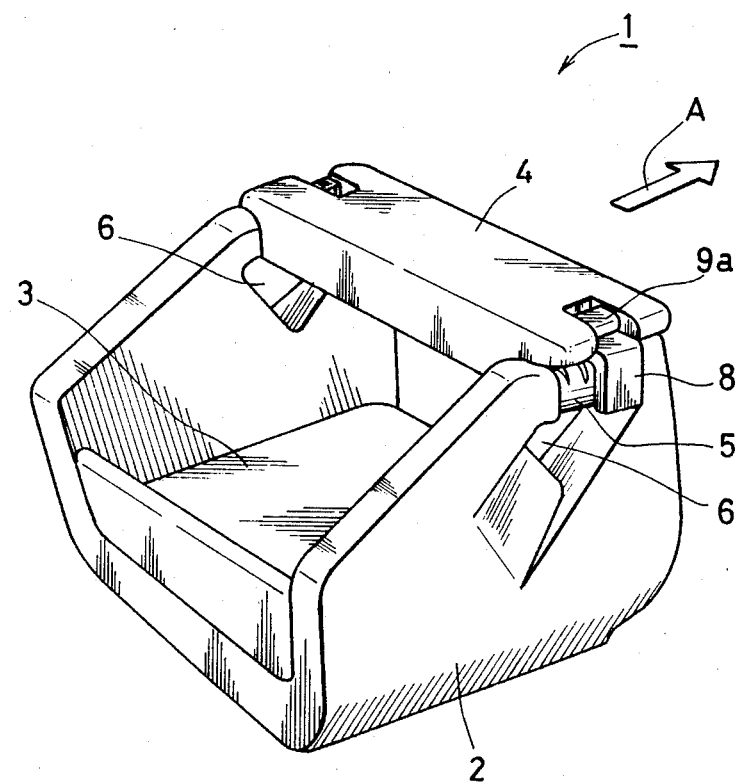
FIG. 1 is a perspective view of an embodiment of the invention.

FIG. 1 shows an embodiment of the invention. The illustrated child's auxiliary seat 1 for automobiles comprises a body 2 which is substantially U-shaped as viewed from the front, a seat member 3 placed on said body 2 for supporting from below a child's hips, and a safety guard 4 disposed on the body 2. The safety guard 4 serves to prevent the child from being thrown forward. In addition, the term "forward" means the direction of arrow A in FIG. 1, with the child seated on the auxiliary seat 1 facing in the direction of arrow A. Further, in this specification, the right-hand side of the child sitting on the auxiliary seat 1 will be referred to as the "right-hand side" and the left-hand side of the child as the "left-hand side".

Figure 2:
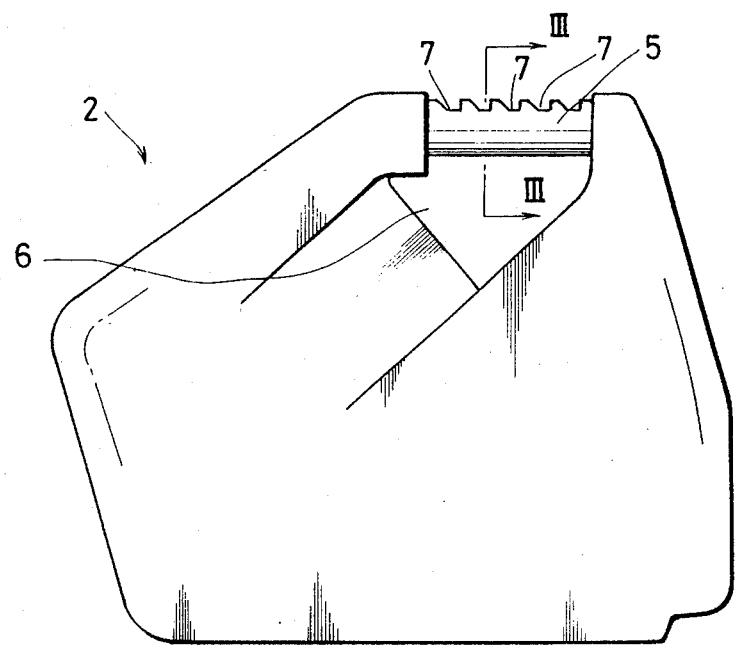
FIG. 2 is a right-hand side view of a body 2 shown in FIG. 1.

FIG. 2 is a right-hand side view of the body 2 shown in FIG. 1. Referring to FIGS. 1 and 2, the right- and left-hand sides of the body 2 are provided at their upper portions with a pair of longitudinally extending handrails 5. In FIGS. 1 and 2, the right-hand side handrail 5 alone is seen. The lower portions of the handrails 5 are formed with openings 6. An adult's belt furnished to the automobile will be passed through the openings to thereby firmly fasten the child's auxiliary seat 1 for automobiles to the seat of the automobile.

The construction for attaching the safety guard 4 for the child's auxiliary seat 1 for automobiles is provided in connection with said pair of handrails 5. Since the arrangement associated with the right-hand side handrail is substantially the same as that associated with the left-hand side handrail, only the right-hand side handrail 5 will be described in detail.

Figure 3:
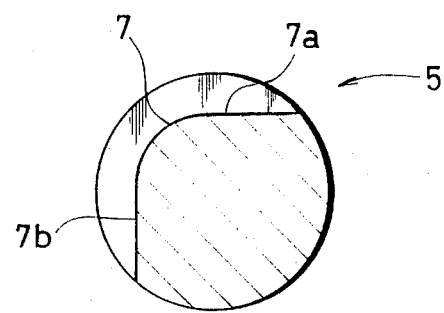
FIG. 3 is a sectional view taken along the line III—III in FIG. 2.

Referring to FIG. 3 showing a sectional view taken along the line III—III in FIG. 2, the handrail 5 is substantially circular in cross-section. As shown, the handrail 5 is formed with circumferentially extending engagement recesses 7. Each recess 7, as shown in FIG. 3, is formed to extend to the upper and inner lateral sides of the handrail 5. The portion 7a of the engagement recess 7 positioned on the upper portion of the handrail 5 extends substantially horizontally, while the portion 7b positioned on the inner lateral side of the handrail 5 is formed to extend substantially vertically. As shown in FIG. 2, these engagement recesses 7 are arranged in the longitudinal direction.

Referring to FIG. 1, the safety guard 4 is installed to extend across the pair of handrails 5 and is designed so that it is longitudinally slidable. This will now be described in more detail.

Figure 4:
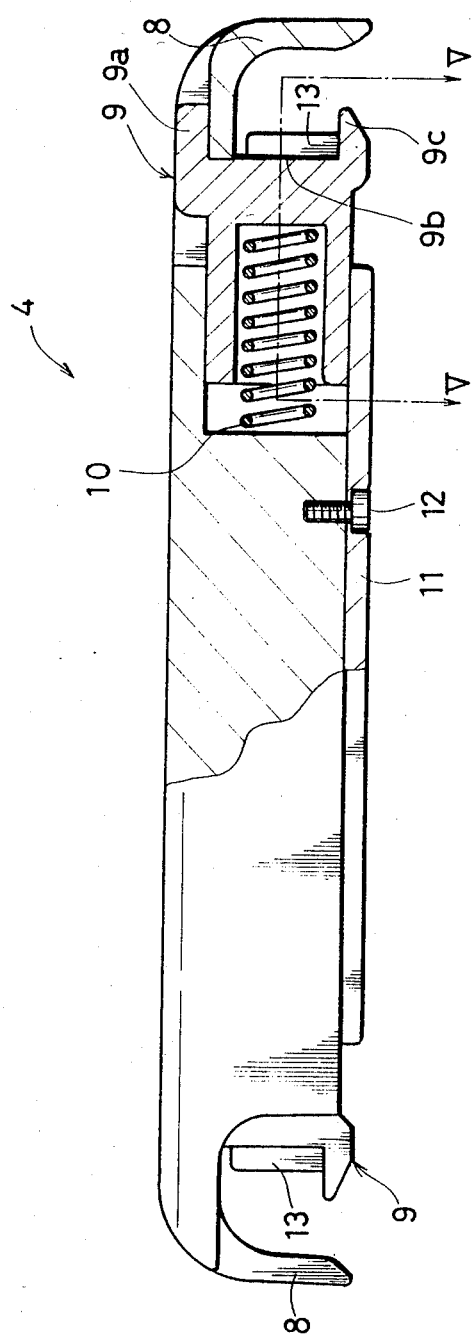
FIG. 4 is a rear view, partly in section, of a safety guard 4 shown in FIG. 1.

FIG. 4 is a rear view, partly in section, of the safety guard 4 shown in FIG. 1. Referring to FIGS. 4 and 1, fixedly installed on the right- and left-hand sides of the safety guard 4 are a pair of depending members 8 extending downward while abutting against the outer sides of the pair of handrails 5. Further, installed on the right- and left-hand sides of the safety guard 4 are a pair of sliders 9 adapted to abut against the inner lateral and bottom sides of the pair of handrails 5. The sliders 9 are slidable transversely of the auxiliary seat. As shown in FIG. 4, each slider 9 comprises an upper projection 9a extending over the depending member 8, a central portion 9b adapted to abut against the inner lateral side of the handrail 5, and a lower projection 9c adapted to abut against the lower side of the handrail 5. Disposed between the slider 9 and the safety guard 4 is a spring 10, as shown in FIG. 4. The spring 10 constantly urges the slider 9 toward the handrail 5.

The lower surface of the safety guard 4 has a support plate 11 fixed thereto by screws 12. The sliders 9 slide on this support plate 11.

Figure 5:
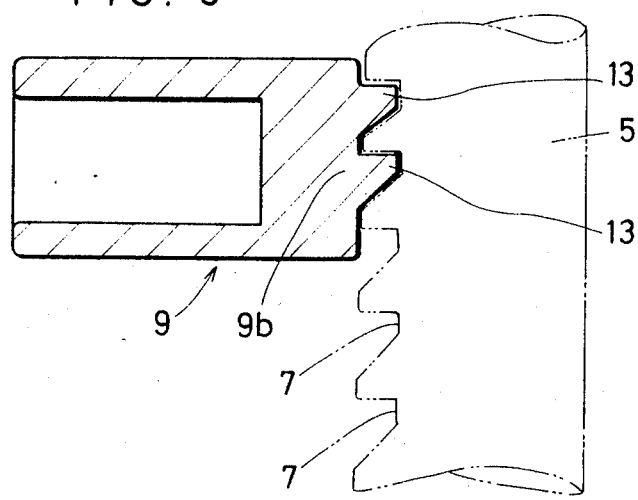
FIG. 5 is a sectional view taken along the line V—V in FIG. 4.
Figure 6:
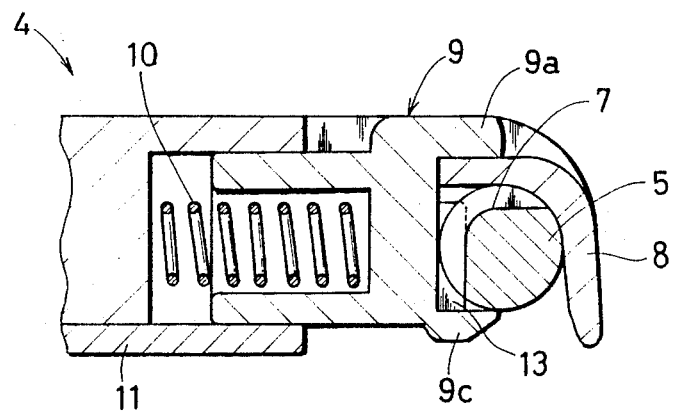
FIG. 6 is a sectional view showing the manner of engagement between engagement ridges 13 on a slider 9 and engagement recesses 7 in a handrail 5.

FIG. 5 is a sectional view taken along the line V—V in FIG. 4. In addition, for the sake of convenience, the spring 10 is omitted from the illustration. Referring to FIGS. 5 and 4, the central portion 9b is formed with two vertically extending engagement ridges 13. The engagement ridges 13 engage the engagement recesses 7 formed in the handrail 5 shown in FIG. 5 in phantom lines. As shown in FIG. 6, when the engagement ridges 13 on the slider 9 and the engagement recesses 7 in the handrail 5 are engaged with each other, longitudinal slide movement of the safety guard 4 is inhibited. The state of engagement between the engagement ridges 13 and the engagement recesses 7 is maintained by the spring 10. With this arrangement wherein the safety guard 4 is fixed to the body 2 by means of engagement between the engagement ridges 13 and the engagement recesses 7, the safety guard has a sufficiently high strength to withstand enormous impacts applied thereto. To increase the strength against impacts, the area of overlapping between the engagement ridges 13 and the engagement recesses 7 has only to be increased. As a concrete example thereof, it may be thought to engage a plurality of engagement ridges 13 and a plurality of recesses 7 with each other. Further, as described above, if the engagement ridges 13 are shaped to extend vertically while the portions 7b of the engagement recesses 7 disposed on the inner lateral sides of the handrails 5 are extended vertically, then their overlapping area can be increased.

Figure 7:
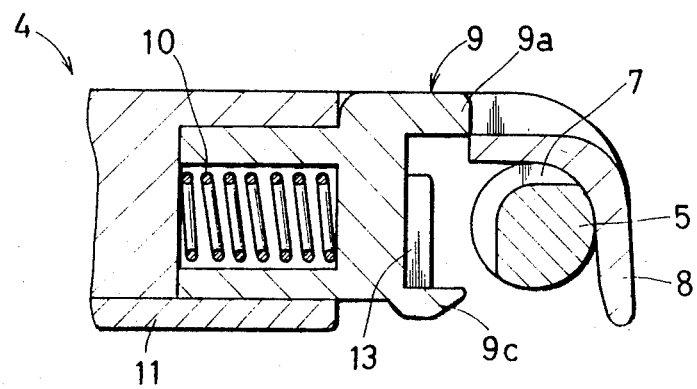
FIG. 7 is a sectional view showing the state established when a slider 9 has been slid against the force of a spring 10.

FIG. 7 shows the state established when the slider 9 has been slid by pressing the upper projection 9a on the slider 9 against the force of the spring 10 from the state shown in FIG. 6. In the state shown in FIG. 7, the engagement between the engagement ridges 13 on the slider 9 and the engagement recesses 7 in the handrail 5 has been canceled. While the slider 9 shown in FIG. 7 is the one associated with the right-hand side handrail 5, if the same operation as described above is applied also to the slider associated with the left-hand side handrail, then the safety guard 4 can be slid longitudinally along the handrails 5. And after the safety guard 4 has been longitudinally slid to the predetermined position, the hands pressing the sliders 9 are removed therefrom, whereupon the sliders 9 are slid by the forces of the springs 10 until their engagement ridges 13 engage the engagement recesses 7 in the handrails 5 again. In this manner, the attaching position of the safety guard 4 can be adjusted in the longitudinally direction.

It is also possible to remove the safety guard 4 from the body 2. That is, in the state shown in FIG. 7, since the overlapping between the handrail 5 and the lower projection 9c on the slider 9 is no longer present when seen straight down, the safety guard 4 can be separated from the handrail 5 by lifting it from the state shown in FIG. 7.

Figure 8:
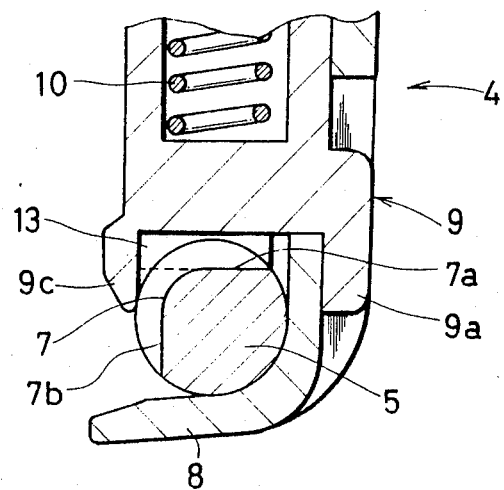
FIG. 8 is a sectional view showing the state established when the safety guard 4 has been turned clockwise from the state shown in FIG. 6.

To open the space in front of the auxiliary seat 1, it is also possible to turn the safety guard 4. FIG. 8 shows the state established by canceling the engagement between the left-hand side handrail and the slider associated therewith and turning the safety guard 4 around the axis of the right-hand side handrail 5. In the state shown in FIG. 8, the engagement ridges 13 on the slider 9 are in contact with those substantially horizontally extending portions 7a of the engagement recesses 7 in the handrail 5 which are positioned in the upper portion of the handrail 5. Further, since the outer lateral side of the handrail 5 is formed with no engagement recesses, the safety guard 4 is held substantially upright, as shown in FIG. 8.

To smooth the turning movement of the safety guard described above, the engagement recess portions 7a positioned in the upper portion of the handrail 5 and the engagement recess portions 7b positioned in the inner lateral side of the handrail 5 are interconnected with smooth curved surfaces. In addition, in FIG. 8, the safety guard 4 has been turned around the axis of the right-hand side handrail 5; however, it goes without saying that the safety guard 4 can be turned around the axis of the left-hand side handrail.

Figure 9:
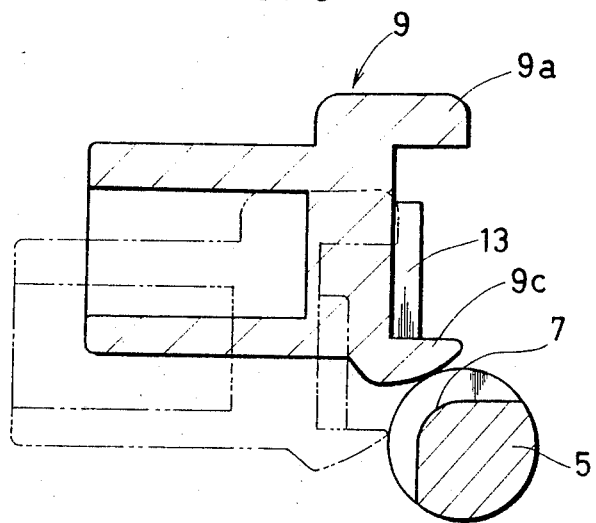
FIG. 9 is a sectional view showing the manner of abutment between the lower projection 9c of the slider 9 and the handrail 5.

Referring to FIG. 9, the lower projection 9c on the slider 9 has its lower surface shaped preferably in the form of a smooth curved surface. With this arrangement, when the safety guard 4 and the body 2 which are now separated are to be engaged together, the intended engagement can be attained without having to touch the sliders with hands. That is, referring to FIG. 9, as the safety guard 4 separated from the body 2 is lowered, first, the lower projection 9c on the slider 9 abuts against the upper portion of the handrail 5. In this state, the safety guard 4 is further lowered, so that the slider 9 is slid against the force of the spring 10 with its lower projection 9c abutting against the outer peripheral surface of the handrail 5, as shown in phantom lines, until at last the engaged state shown in FIG. 6 is obtained.

In the embodiment described above, the slider 9 has been formed with engagement ridges 13 and the handrail 5 with engagement recesses 7. However, the reverse of this arrangement is possible. That is, the slider 9 may be formed with engagement recesses and the handrail 5 with engagement ridges. In the above embodiment, a plurality of engagement recesses 7 and a plurality of engagement ridges 13 have been formed to be arranged in the longitudinal direction. However, to achieve the mechanism for adjusting the attaching position of the safety guard 4, it is only necessary that there be a plurality of at least either engagement ridges or engagement recesses, the other being singular or plural.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A construction for attaching a safety guard for a child's auxiliary seat for automobiles, comprising:
    a pair of handrails (5) extending longitudinally on the right- and left-hand sides of the child's auxiliary seat (1) for automobiles,
    a safety guard (4) disposed across said pair of handrails and adapted to be slid in the longitudinal direction,
    a pair of depending members (8) fixedly installed on the right- and left-hand sides of said safety guard (4) and extending downward while abutting against the outer lateral sides of said pair of handrails (5),
    a pair of sliders (9) disposed on the right- and left-hand sides of said safety guard for slide movement in the transverse direction and adapted to abut against the inner lateral and bottom sides of said pair of handrails (5),
    springs (10) for urging said pair of sliders (9) to abut against the inner lateral sides of said pair of handrails (5),
    the abutting portion of said pair of handrails (5) and said pair of sliders (9) being provided with an engagement ridge or ridges (13) and an engagement recess or recesses (7) which, when engaged with each other, inhibit the longitudinal slide movement of said safety guard (4),
    there being a plurality of either such engagement ridges or such engagement recesses.

2. A construction for attaching a safety guard for a child's auxiliary seat for automobiles as set forth in claim 1, wherein the cross-sectional shape of said handrails (5) is substantially circular.

3. A construction for attaching a safety guard for a child's auxiliary seat for automobiles as set forth in claim 1, wherein said engagement recesses (7) are formed over the upper and inner lateral sides of said handrails (5).

4. A construction for attaching a safety guard for a child's auxiliary seat for automobiles as set forth in claim 3, wherein the portions (7a) of said engagement recesses (7) which are positioned in the upper portions of said handrails (5) are substantially horizontal while the portions (7b) of said engagement recesses (7) which are positioned in the inner lateral sides of said handrails (5) are substantially vertical.

5. A construction for attaching a safety guard for a child's auxiliary seat for automobiles as set forth in claim 4, wherein said portions (7a) positioned in the upper portions of said handrails (5) and said portions (7b) which are positioned in the inner lateral sides of said handrails (5) are interconnected by smooth curved surfaces.

6. A construction for attaching a safety guard for a child's auxiliary seat for automobiles as set forth in claim 1, wherein each said slider (9) comprises an upper projection (9a) extending over said depending member (8), a central portion (9b) adapted to abut against the inner lateral side of said handrail (5), and a lower projection (9c) adapted to abut against the lower side of said handrail (5).

7. A construction for attaching a safety guard for a child's auxiliary seat for automobiles as set forth in claim 6, wherein said lower projection (9c) of said engagement recess (13) has its lower surface shaped in the form of a smooth curved surface.

8. A construction for attaching a safety guard for a child's auxiliary seat for automobiles as set forth in claim 6, wherein said engagement projection (13) extends vertically at said central portion (9b) of said slider (9).

9. A construction for attaching a safety guard for a child's auxiliary seat for automobiles as set forth in claim 1, wherein there are two engagement projections (13) and three or more said engagement recesses (7).

10. A construction for attaching a safety guard for a child's auxiliary seat for automobiles as set forth in claim 1, wherein said springs (10) are disposed between said sliders (9) and said safety guard (4).

* * * * *